Patented Oct. 7, 1952

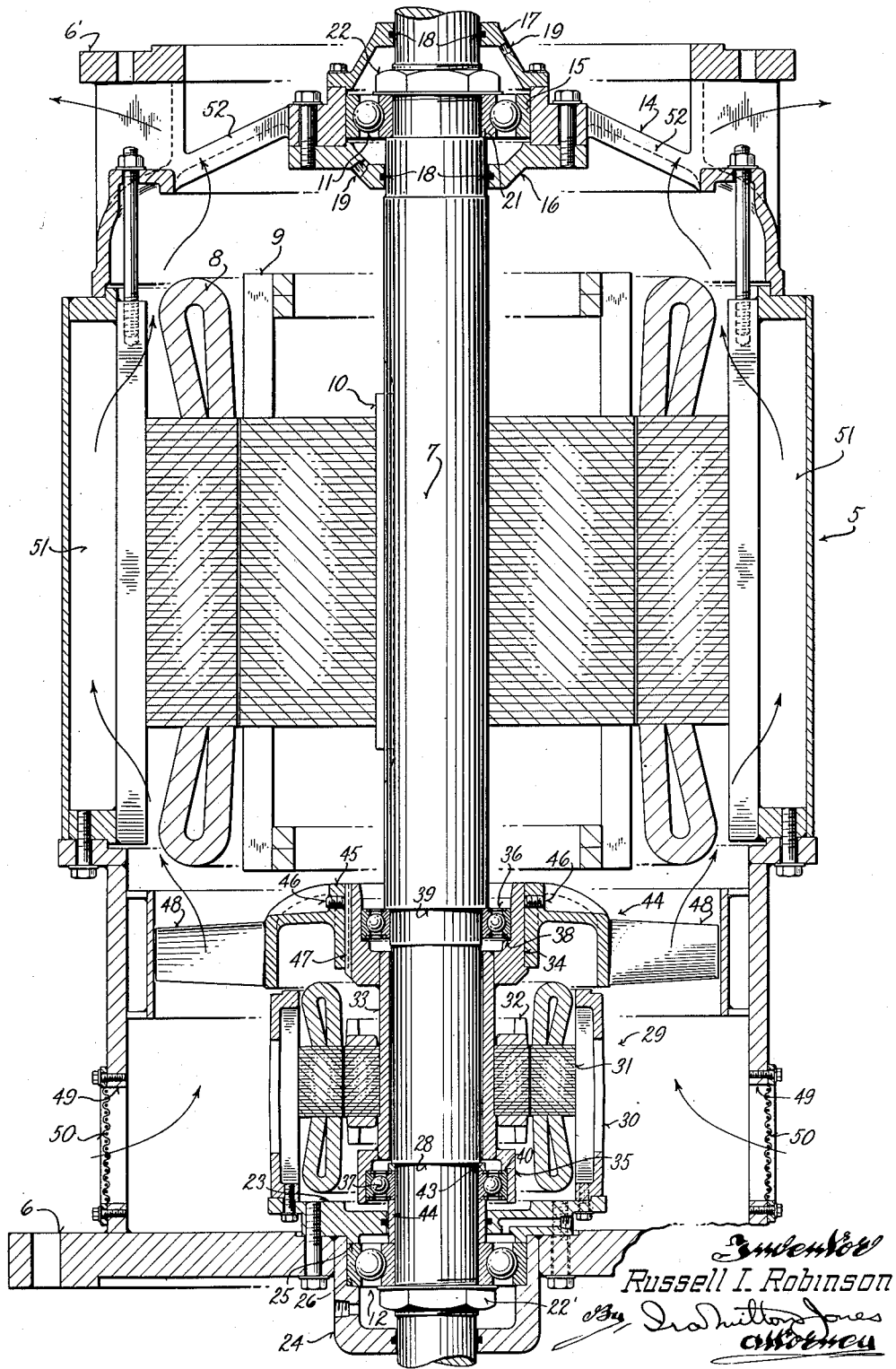

2,613,240

UNITED STATES PATENT OFFICE 2,613,240

MEANS FOR COOLING HEAVY DUTY MOTORS

Russell I. Robinson, Milwaukee, Wis., assignor to The Louis Allis Company, Milwaukee, Wis., a corporation of Wisconsin Application September 11, 1950, Serial No. 184,145

3 Claims. (Cl. 172—36)

This invention relates to electric motors and refers more particularly to cooling means for heavy duty electric motors.

In certain types of installations electric motors of relatively high horsepower operate under frequently varying load and speed conditions so that the usual cooling arrangement, comprising a fan mounted on the rotor for rotation therewith, is entirely inadequate, especially since the rotor is frequently operated at speeds at which the air circulation effected by the fan is at a rate less than that normally required for cooling while at the same time the motor tends to heat more than it ordinarily does.

Extractor motors used in sugar refineries are an example of an application or type of service in which this problem has been particularly acute because of the fact that such motors are subjected to constant acceleration and deceleration so that extremely large loads are imposed upon them, necessitating the dissipation of large amounts of heat.

In the present invention this difficulty is overcome by providing a separate relatively small cooling motor which rotates the fan blades at a constant speed and thus provides a constant volume flow of cooling air across the heavy duty motor regardless of variations in the speed of the heavy duty motor.

Thus it is an object of this invention to provide a cooling motor for a heavy duty motor of the character described, which cooling motor is housed in the same housing with the heavy duty motor and which is unusually compact by reason of the fact that its rotor is coaxial with the rotor of the heavy duty motor.

Another object of this invention resides in the provision of a heavy duty motor which is cooled by a separate cooling motor, with the latter having its rotor freely rotatably mounted on the heavy duty motor shaft by means of a simple and compact arrangement of bearings which enables the rotor of the cooling motor to rotate at a constant speed, regardless of the speed of the main rotor.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

The single figure is a longitudinal sectional view through a heavy duty electric motor constructed in accordance with this invention.

Referring now to the accompanying drawing, the numeral 5 designates generally a housing for a heavy duty motor of the type which is adapted to be subjected to varying loads and frequent acceleration and deceleration. The housing has a flat base 6 and a flanged top 6' to permit the motor to be mounted on either the top or the bottom of a machine (not shown), such as an extractor of the type used in sugar refineries, with the motor shaft 7 extending vertically into the machine. For this purpose, the motor shaft must extend from both ends of the housing for connection of either end of the shaft with apparatus to be driven. A wound stator 8, stationarily mounted within the upper portion of the housing, and a squirrel-cage rotor 9, secured to the shaft 7 by means of a key 10, comprise the heavy duty motor itself.

The motor shaft is journaled in an upper main bearing 11 and a lower main bearing 12, secured at the top and bottom of the motor housing, respectively, and preferably both are ball bearings. The hub of the upper end bell 14 of the motor housing has a central bore 15 which provides a seat for the bearing 11, and a dish shaped cover plate 16, secured under the bearing seat to the inner face of the hub, provides the bottom of an oil reservoir for the ball bearing, the top of the oil reservoir being closed by an oppositely dished cover plate 17 secured to the outer face of the hub of the end bell. A constant flow of lubricant to the bearing 11 is provided by means of oil ducts (not shown) connected into a tapped port 19 in each cover plate.

The shaft, of course, passes through the central bore in each cover plate, and oil leakage along the shaft, from the interior of the reservoir defined by the two cover plates 16 and 17 and the bore 15 in the end bell, is precluded by means of oil seals 18 in the bores of the cover plates. The inner race of the bearing 11 is clamped between a shoulder 21 on the shaft, defined by a reduction in the diameter of the shaft above the shoulder, and a nut 22 threaded onto the reduced diameter portion of the shaft.

The seat for the lower main bearing 12 is very similar in construction to that for the upper main bearing except that its upper and lower reservoir covers 23 and 24, respectively, define a pair of opposed shoulders 25 and 26 which are spaced apart a distance equal to the axial length of the outer race of the lower main bearing 12 and thus lock this bearing race between them to hold the bearing against axial displacement.

Since the inner race of the lower main bearing is clamped between a nut 22' threaded onto the shaft and a shoulder 28 on the shaft, in a manner to be described presently, the lower main bearing 12 serves as a thrust bearing to hold the shaft against shifting axially. The upper main bearing, however, is not held against axial displacement, to accommodate any differences in the rates of thermal expansion of the shaft and the housing.

The upper reservoir cover 23 for the lower main bearing also provides the lower end bell of a cooling motor 29 which occupies the lower portion of the housing 5. The frame 30 of the cooling motor is mounted upon and bolted to the cover 23 with the stator 31 coaxial with the shaft. The rotor 32 of the cooling motor, which is preferably of the squirrel cage type, is mounted on a sleeve 33 which surrounds the lower portion of the motor shaft and is freely rotatable with respect thereto.

Fixed to the ends of the sleeve 33 are upper and lower cup shaped bearing receptacles 34 and 35, respectively, to receive a top fan bearing 36 and a bottom fan bearing 37. These bearings journal the sleeve on the shaft. An upwardly facing shoulder 38 in the upper receptacle 34 engages the outer race of the top fan bearing 36 and cooperates with a downwardly facing shoulder 39 on the shaft (defined by a reduced diameter portion thereof), which engages the top of the inner race, to preclude upward axial displacement of the sleeve with respect to the shaft. Downward displacement of the sleeve is prevented by a downwardly facing shoulder 40 in the lower bearing receptacle which engages the outer race of the bottom fan bearing 37 and by supporting the inner race of said bearing in a manner now about to be described.

A second downwardly facing shoulder 28 on the lower portion of the shaft is defined by a portion of the shaft therebelow having a further reduced diameter, and a short spacer sleeve 43 is interposed between this shoulder and the top of the inner race of the bearing 37. Another spacer sleeve 44 is interposed between the inner races of the bottom fan bearing 37 and the main bearing 12. The nut 22' and the shoulder 28 cooperate with these spacer sleeves to clamp the inner races of these two bearings in axially spaced apart relationship, fixed with respect to one another and the shaft. Since, as has already been pointed out, the outer race of the lower main bearing 12 is secured between the top and bottom covers 23 and 24 of the lower oil reservoir, securement of the shaft to its inner race in this manner enables the lower main bearing to hold the shaft against axial displacement.

The upper bearing receptacle 34, in addition to serving as a seat for the bearing 36 also provides a mounting for an impeller 44. The hub 45 of the impeller fits over and is fixed to the bearing receptacle 34 by set screws 46 and a key 47. The hub is substantially dome shaped and the fan blades 48 radiate therefrom and are preferably cast integrally therewith.

Cooling air for the motor is taken into the housing through air ports 49 near the bottom thereof, the inlets being provided with screens 50 to prevent the entry of foreign matter into the motor mechanism. Since the frame of the cooling motor is merely a support for the stator rather than a complete housing, air drawn into the motor housing will tend to circulate across the cooling motor to thus maintain it at a low temperature, although it will be understood that cooling of the fan motor is not a serious problem because of its small size and constant speed.

Since the rotor of the cooling motor drives the fan blades at a constant speed, cooling air will be drawn into the housing at a constant rate and will at all times be impelled upwardly across the heavy duty motor so long as the cooling motor is running. It will be noted that the housing of the heavy duty motor provides air passages 51 around the stator thereof to assure adequate cooling and that the air leaves the housing through outlet ports 52 in the upper end bell.

In order to minimize relative rotation between the cooling motor and the main motor, the two rotors turn in the same direction and preferably rotate at the same speeds when both are operating at their full synchronous speeds.

From the foregoing description, taken together with the accompanying drawing, it will be readily apparent that this invention provides a simple and compact cooling device for a heavy duty motor of the type which is subjected to frequent accelerations and decelerations.

What I claim as my invention is:

1. In a heavy duty electric motor having a housing provided with ventilating openings adjacent to its opposite ends, a heavy duty motor in one end portion of the housing, an impeller equipped cooling motor in the other end portion of the housing, each of said motors including a stator fixed with respect to the housing and an armature encircled by the stator, characterized by the provision of: a single motor shaft encircled by said armatures and journalled in bearings on the ends of the housing, and having the armature of the heavy duty motor fixed thereto; a sleeve rotatably journalled on the motor shaft by bearings confined between the shaft and the walls of bearing hubs formed on the ends of the sleeve, said sleeve having the armature of the cooling motor fixed to its exterior, and the impeller being mounted on the bearing hub of the sleeve adjacent to the heavy duty motor; and a frame upon which the stator of the cooling motor is mounted, said frame being secured to the end of the housing remote from the heavy duty motor and being radially spaced from the surrounding housing walls to permit the passage of cooling air therebetween.

2. The heavy duty electric motor set forth in claim 1, wherein the ends of the motor housing are substantially flat and normal to the axis of the rotor shaft to provide for mounting the motor with the rotor shaft vertical; and further characterized by the fact that the rotor shaft projects outwardly beyond each end of the motor housing so that either end of the shaft may be connected with apparatus to be driven.

3. In a heavy duty electric motor having a housing provided with ventilating openings adjacent to its opposite ends, a heavy duty motor in one end portion of the housing, an impeller equipped cooling motor in the other end portion of the housing, each of said motors including a stator fixed with respect to the housing and an armature encircled by the stator, characterized by the provision of: a single motor shaft encircled by said armatures and journaled in bearings on the ends of the housing, and having the armature of the heavy duty motor fixed thereto; a sleeve rotatably journaled on the motor shaft and having the armature of the cooling motor fixed to its exterior, and the impeller being mounted on the end portion of the sleeve adjacent to the heavy duty motor; and a frame upon which the stator of the cooling motor is mounted, said frame being secured to the end of the housing remote from the heavy duty motor and being radially spaced from the surrounding housing walls to permit the passage of the cooling air therebetween.

RUSSELL I. ROBINSON.

REFERENCES CITED

The following references are of record in the file of this patent:

UNITED STATES PATENTS

| Number | Name | Date |
|---|---|---|
| 953,219 | Muller | Mar. 29, 1910 |
| 1,017,257 | Frankenfield | Feb. 13, 1912 |
| 1,209,992 | Nye | Dec. 26, 1916 |
| 1,375,319 | Rae | Apr. 19, 1921 |
| 1,688,691 | Drake | Oct. 23, 1928 |
| 1,780,150 | Ahlm | Nov. 4, 1930 |
| 1,780,337 | Canton | Nov. 4, 1930 |
| 1,914,988 | Bergstrom | June 20, 1933 |
| 2,294,713 | Boerger | Sept. 1, 1942 |
| 2,469,820 | Fuge | May 10, 1949 |

FOREIGN PATENTS

| Number | Country | Date |
|---|---|---|
| 123,947 | Australia | Apr. 1, 1947 |
| 641,208 | Germany | Jan. 12, 1933 |